United States Patent
Bormann

(10) Patent No.: US 10,443,723 B2
(45) Date of Patent: Oct. 15, 2019

(54) PARKING LOCK DEVICE FOR A MOTOR VEHICLE

(71) Applicant: ZF Friedrichshafen AG, Friedrichshafen (DE)

(72) Inventor: Dirk Bormann, Bissendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 208 days.

(21) Appl. No.: 15/513,219

(22) PCT Filed: Aug. 13, 2015

(86) PCT No.: PCT/EP2015/068612
§ 371 (c)(1),
(2) Date: Mar. 22, 2017

(87) PCT Pub. No.: WO2016/045867
PCT Pub. Date: Mar. 31, 2016

(65) Prior Publication Data
US 2017/0307080 A1    Oct. 26, 2017

(30) Foreign Application Priority Data

Sep. 22, 2014  (DE) .................. 10 2014 219 037

(51) Int. Cl.
*F16H 63/34* (2006.01)
*F16H 59/10* (2006.01)
(Continued)

(52) U.S. Cl.
CPC .......... *F16H 63/3416* (2013.01); *B60T 1/005* (2013.01); *F16H 1/16* (2013.01);
(Continued)

(58) Field of Classification Search
CPC ............. F16H 63/3416; F16H 63/3425; F16H 63/3433; F16H 63/3441; F16H 63/34;
(Continued)

(56) References Cited

U.S. PATENT DOCUMENTS

| 7,025,188 B2 * | 4/2006 | Lindenschmidt ... F16H 63/3416 188/31 |
| 2003/0019713 A1 * | 1/2003 | Gudlin .................... B60T 7/107 192/219.4 |
| 2006/0278029 A1 * | 12/2006 | Burgbacher ............ F16H 59/08 74/335 |

FOREIGN PATENT DOCUMENTS

| DE | 10 2009 028 128 A1 | 2/2011 |
| DE | 10 2010 029 704 A1 | 12/2011 |

OTHER PUBLICATIONS

International Search Report and Written Opinion of the International Search Authority dated Oct. 30, 2015 in International Application No. PCT/EP2015/068612 (English and German languages) (11 pp.).

* cited by examiner

*Primary Examiner* — Jacob S. Scott
*Assistant Examiner* — James J Taylor, II
(74) *Attorney, Agent, or Firm* — Brinks Gilson & Lione

(57) ABSTRACT

In one aspect, the present disclosure provides a parking brake device for a motor vehicle. The device may include a vehicle transmission including a parking lock and a gear selector lever coupled with the parking lock, where the gear selector lever is movable into a parking lock position for engaging the parking lock, and where the gear selector lever is movable out of the parking lock position for disengaging the parking lock. A first mechanical transmission element and a second mechanical transmission element may be arranged between the gear selector lever and the parking (Continued)

lock, where the first mechanical transmission element may be connected with the gear selector lever and configured for transmitting a moving force emanating from the gear selector lever to the second mechanical transmission element, and where the second mechanical transmission element may be connected with the parking lock.

18 Claims, 9 Drawing Sheets

(51) Int. Cl.
*B60T 1/00* (2006.01)
*F16H 1/16* (2006.01)
*F16H 61/32* (2006.01)
*F16H 61/36* (2006.01)

(52) U.S. Cl.
CPC ............ *F16H 59/10* (2013.01); *F16H 63/34* (2013.01); *F16H 61/36* (2013.01); *F16H 63/3466* (2013.01); *F16H 63/3491* (2013.01); *F16H 2061/326* (2013.01)

(58) Field of Classification Search
CPC ............ F16H 63/3408; F16H 63/3458; F16H 63/3466; F16H 63/3475; F16H 63/3491
See application file for complete search history.

PARKING LOCK DEVICE FOR A MOTOR VEHICLE

CROSS REFERENCE TO RELATED APPLICATIONS

This application is a filing under 35 U.S.C. § 371 of International Patent Application PCT/EP2015/068612, filed Aug. 13, 2015, and claims the priority of German Patent Application 10 2014 219 037.1, filed Sep. 22, 2014. These applications are incorporated by reference herein in their entireties.

BACKGROUND

The present disclosure relates to an electronic transmission control device. Furthermore, the present disclosure relates to a method for the production of an electronic transmission control device.

The present disclosure relates to a parking brake device for vehicle transmissions, as well as a method for manufacturing a parking brake device and a method for actuating a parking lock by means of a parking brake device.

Document DE 10 2009 028 128 A1 written by the applicant, which is herein incorporated by reference in its entirety, discloses a parking brake device for a motor vehicle, which comprises a vehicle transmission, especially an automatic transmission, which has a parking lock and a gear selector lever coupled with the parking lock. The gear selector lever can be moved into a parking lock position for engaging the parking lock, and it can be moved out of the parking lock position for disengaging the parking lock. A first and second mechanical transmission element are arranged between the gear selector lever and the parking lock. The first mechanical transmission element is coupled with the gear selector lever for transmitting a moving force emanating from the gear selector lever, while the second mechanical transmission element is coupled with the parking lock for transmitting a moving force emanating from the first mechanical transmission element. The parking brake device comprises a movable coupling device for transmitting the moving force emanating from the first mechanical transmission element to the second mechanical transmission element. The coupling device is arranged between the first and second mechanical transmission element and coupled with the first and second mechanical transmission element. The parking brake device can be used as a modular component in a power transmission path between the gear selector lever and the parking lock.

Modern motor vehicles provide a plurality of assistance systems by means of which the safety and ease of use should be increased. For example, particularly in motor vehicles with automatic transmissions, so-called intelligent or piloted parking assistant systems were incorporated, by means of which a motor vehicle could park independently, in other words, autonomous, without participation of the driver. For example, the motor vehicle should be in a position to drive the vehicle autonomously on a parking space, or park in a parking space, without the presence of the driver.

By means described in the present disclosure, the parking brake device described above should be further developed and improved. At the same time, an improved parking brake device should be provided, which has a simple structure and which is especially suitable for the above-mentioned parking assistance system.

DESCRIPTION

According to embodiments of the present disclosure, the parking brake device comprises a movable coupling device for transmitting the moving force emanating from the first mechanical transmission element to the second mechanical transmission element. The coupling device is arranged between the first and the second mechanical transmission element and coupled with the first and second transmission element.

Embodiments of the present disclosure are characterized in that the parking brake device comprises a decoupling device for decoupling a coupling between the coupling device and the first or second transmission element in the parking lock position of the gear selector lever. Thus, the decoupling device corresponds with a device for releasing or decoupling a coupling or a detachable connection. Therefore, the coupling between the coupling device and the first or second transmission element can at least be detached in the parking lock position of the gear selector lever. As a result, a normally fixed connection between the first and second transmission element can be repeatedly separate or decoupled or released. Thus, the second mechanical transmission element can be actuated independent of a movement of the first mechanical transmission element or the gear selector lever. For example, an engaged parking lock, which was activated by moving the gear selector lever into the parking lock position, can be disengaged again despite the fact that the gear selector lever is located in the parking lock position, thus placing the motor vehicle into running condition. At the same time, the gear selector lever remains in its parking lock position and can be locked in its movement, for example, by means of a blocking element, and can be unlocked again by means of an unblocking element.

According to the present disclosure, the parking brake device also comprises a sliding element for moving the second transmission element. The sliding element is provided for moving the second mechanical transmission element relative to the first mechanical transmission element in the decoupling condition to release or disengage the parking lock. Therefore, a sliding element involves an element, which can be moved in opposite directions between at least two positions and which is designed to move a further element, wherein a required power transmission between the sliding element and the further element can be realized by means of an attachment or a detachable or non-detachable connection. Preferably, the initiated movement of the further element can be performed in rotating manner in the form of a rotational movement, in translational manner, even more preferred in linear manner, in the form of at least a sliding movement resulting from a compressive force or a traction movement resulting from a tensile force, or a combination of a rotational and translational movement. Therefore, a sliding movement is a movement in one direction, wherein the movement can be caused by compressive force or tensile force.

A parking lock to be activated by a parking brake device according to the present disclosure can be formed, for example, by a customary blocking system, such as a locking pawl, which can be engaged in a tooth system of a parking lock wheel arranged on a transmission output shaft.

A mechanical transmission element in terms of the present disclosure is corresponding to a component, which is designed to transmit at least a tensile force or compressive force. For this purpose, the mechanical transmission element can preferably be designed in the form of a cable pull mechanism or a push rod or a combination of both. Preferably, the first mechanical transmission element comprises a push rod. The use of a push rod is especially suitable for shorter and/or straight power transmission paths. Furthermore, the second mechanical transmission element is preferably designed in the form of a cable pull mechanism. A cable pull mechanism is especially suitable for longer and/or non-linear transmission paths.

According to a preferred embodiment of the present disclosure, the coupling device is or can be detachably coupled with the first or second mechanical transmission element by means of an engagement means comprising at least one engagement member that can be moved transverse to the movement axis and a receptacle, in which the engagement member can be engaged, and connected or connectable with the other mechanical transmission element in immovable fashion toward each other. As a result, it is possible to provide reliably a detachable coupling between the first and second mechanical transmission element and the coupling device. At the same time, it is at first irrelevant whether the coupling device is or can be connected detachably or immovably toward each other with the first mechanical transmission element, which cannot be moved in the parking lock position, or with the second mechanical transmission element, which can be moved in the parking lock position in the decoupling condition. However, preferably the coupling device is immovably connected with the second transmission element. In other words, preferably the coupling device is or can be connected with the second transmission element in a position in which both can be moved in the decoupling condition. The connection can be implemented with a customary screw, clamp, plug, snap-on or similar connection. Therefore, preferably the coupling device is or can be coupled in detachable fashion with the first mechanical transmission element, wherein the detachable coupling is performed by the engagement means. As a result, it is possible to install the parking brake device subsequently in a power transmission path between a selector leer device and a motor vehicle transmission device. At the same time, at least one free connection point, for example, of the second mechanical transmission element can be used without the need for adjustment. Preferably, a molded part with the coupling device can be provided for the first mechanical transmission element, wherein the molded part and the coupling device can be adjusted to each other via the engagement means. For example, the movable engagement member can be provided with the coupling device and the receptacle with the first mechanical transmission element, preferably with the form part, wherein the form part can be connected with the first mechanical transmission element and preferably in a connected state form a free end of the first mechanical transmission element. Alternatively, the engagement member can be designed or provided with the first mechanical transmission element, preferably with the form part, and receptacle with the coupling device. It is further preferred that the form part is formed by a plate-shaped element, which can be engaged in a receptacle for the form part designed together with the coupling device. Alternatively, or additionally, by means of the form part it is possible to use a free connection point of the first mechanical transmission element without the need for an adjustment. Alternatively, the first mechanical transmission element can be a component of the parking brake device, wherein the first mechanical transmission element can be adjusted prior to assembly to the selector lever device to be coupled. The above-mentioned preferred embodiments are especially suitable for subsequently assembling the parking brake device in the power transmission path between the selector lever and motor vehicle transmission device, wherein these can have differently designed connection points.

According to a preferred embodiment, the decoupling device comprises a movable decoupling member for moving the engagement member into a non-engaged condition. Thus, it is possible to achieve a non-engaged condition or a decoupled condition between the coupling device and the mechanical transmission element by performing a relative displacement between the decoupling member and the engagement member. Preferably, the decoupling member can also be moved along the movement axis of the coupling device and has a sliding surface, along which a sliding component fixed with the at least one engagement member can be moved, wherein the sliding surface extends transversal to a movement axis of the at least one engagement member. Furthermore, the sliding surface is preferably surrounded by at least two opposite sliding surface boundaries, wherein the sliding surface boundaries have a different distance along the movement axis of the coupling device to the front end of the decoupling member close to the sliding component. Preferably, the sliding surface extends at an acute angle to a middle axis of the decoupling member, starting at the sliding surface boundary near the front end, wherein the middle axis parallel extends parallel to the movement axis of the coupling device. According to a preferred embodiment, the decoupling member can be designed in such a way that it is tapered toward the front end at least on one side. Preferably, the front end of the decoupling member is designed to be tapered on both sides of the middle axis, in relation to its middle axis. At the same time, each tapered side comprises a sliding surface, along which a respective sliding component can be moved. Each of the sliding components is fixed at a movable engagement member. Furthermore, preferably, the movable engagement members are located opposite from each other, especially along a mutual movement axis, preferably spaced apart with the receptacles attached to the respective engagement member placed between them.

For example, the engagement member can be formed by a pin, which is movably supported along its extension axis in the coupling device, and comprise a projection, which forms the sliding component. Preferably, the projection can protrude from the pin perpendicular to the extension axis of the pin. As a result, it is possible to implement a movable bearing and a coupling point for moving the pin on different planes.

Furthermore, the engagement member can preferably be supported in movable fashion under spring pre-tension. For example, a spring element, especially a compression spring, can be provided, which impinges the engagement member with spring pressure and thus can be engaged in preloaded fashion in the receptacle. As a result, the engagement member can be automatically moved into an engagement state, as soon as the spring pressure is greater than a counter-pressure which, for example, the decoupling device exerts on the pin. In addition, it is thus possible to achieve a reliable engagement state. An arrangement of the spring element can be freely selected as long as the spring pressure is exerted on the pin in the direction of the receptacle. At the same time, the spring element can load the pin with spring pressure by means of an attachment at the pin or via an intermediate attachment element. A simple structural design of the decoupling device can also be adjusted in its dimensions as needed.

Preferably, the decoupling member comprises a plate or frame-shaped, especially polygonal, component having at least one lateral surface, which forms the sliding surface. In this way, it is possible to provide a flat decoupling member, which still allows the dimensions of the decoupling device to be adjusted as needed.

Further preferred, the decoupling member and the sliding element form a constructional unit. The sliding element comprises an attachment surface to be attached with the coupling device, wherein the sliding surface of the decoupling member is positioned upstream of the attachment surface of the sliding element in sliding direction in such a way that initially, when moving the constructional unit, the at least one engagement member can be moved into the non-engaged condition and then the coupling device can be moved. Preferably, the decoupling member and the sliding element can be produced from one piece. Alternatively, the decoupling member and the sliding element can be preferably assembled from at least two interconnected components. As a result, it is possible to combine the decoupling member and the sliding element functionally in a constructional unit or in a one-piece or multiple-piece component. Therefore, the parking brake device can have a more compact design.

According to a preferred embodiment of the present disclosure, the parking brake device comprises at least one drive unit for driving the decoupling device and the sliding element. Preferably, a mutual drive unit can be provided for driving the decoupling device and the sliding element. Alternatively, one drive unit can be provided, respectively, for the decoupling device and the sliding element. As a result, it is possible to drive the decoupling device and the sliding element separately from each other. Preferably, the at least one drive unit can be electrically connected with at least one control or regulating device or with a control and regulating device, which controls and/or regulates the at least one drive unit for driving the decoupling device and the sliding element.

Preferably, the drive unit also comprises a worm gear with a worm and a worm wheel coupled with the worm. The worm wheel comprises a tappet for driving a knee lever device, which is or can be coupled with the decoupling device and the sliding element. Preferably, the tappet also protrudes from a radial surface of the worm wheel. Preferably, the tappet is also arranged close to the edge at the outer circumference of the worm wheel. By means of the knee lever device, it is possible in a simple manner to convert a rotationally applied driving force in a translational driving force.

Preferably, the knee lever device comprises a movable knee joint connection for moving in relative fashion a first free knee lever end to a second free knee lever end, wherein the knee lever device comprises a sliding surface, along which the tappet for moving the knee joint device can be moved. Preferably, the knee lever device also comprises a boom, which is or can be connected with the knee joint connection and which forms the sliding surface. The boom is designed to transfer a compressive force exerted on the boom to the knee lever device. Therefore, the knee joint connection can be spaced from the drive unit, thus preventing that the knee joint connection constructively overlaps with the worm wheel. As a result, the parking brake device can have a reduced constructional depth in the area of the drive unit and knee lever device. Preferably, a power transmission point of the boom is arranged at least in the area of or adjacent to the knee joint connection. In this way, it is possible to achieve an optimized power transfer from the boom to the knee joint connection. As a result, it is possible to use a drive unit with less power and reduced installation space for driving the knee lever device and the components that are or can be coupled with it, such as the decoupling device and the sliding element.

Preferably, the drive unit comprises an actuator, which actuates the worm, wherein preferably the actuator is or can be connected with the control and regulating device.

Furthermore, preferably the knee lever device comprises a first and a second knee lever, which are connected with each other via the knee lever joint connection, wherein the first free knee lever end is formed by the first knee lever and the second free knee lever end is formed by the second knee lever. Furthermore, preferably the first and the second knee lever ends are arranged on a mutual axis, which defines a movement axis for the relative movement between the first and the second free knee lever end. Preferably, the first free knee lever end is provided to be fixed and the second free knee lever end is provided to be movable. As a result, the knee joint connection can be moved in relation to the array axis or movement axis, wherein the first and second knee lever, depending on a relative position of the first and second free knee lever end, include a predetermined angle as a vertex, starting from the knee joint connection. At the same time, the first and second free knee lever ends define a leg point, respectively. Depending on a value of the enclosed angle, the leg points have a respective distance to each other. At an angular value of 0° or 360°, the leg points are located on a mutual axis with the vertex, wherein the leg points have the smallest distance to each other along a movement axis of the relative movement. The leg points are now located on an identical side in relation to the vertex. At an angular value of 180°, the leg points are located on a mutual axis with the vertex in an intermediate position, wherein the leg points have the largest distance to each other along the movement axis of the relative movement. The leg points are now located on different sides in relation to the vertex. The larger an angular value in a range of between 0° and 180°, the larger the distance between the leg points or between the first and second free knee lever end along the movement axis of the relative movement. In this way, it is possible to determine a maximum movement path or distance between the first and second free knee lever end, depending on the angular value.

Especially preferred, the knee lever device comprises a limit stop device for limiting the relative movement or distance between the first and second free knee lever end. Preferably, the limit stop device comprises a first limit stop unit with a first limit stop and a second limit stop unit with a second limit stop for stopping or attaching at the first limit stop, wherein the first and second limit stop are provided with different knee levers on a mutual side of the knee lever device. A stop state in which the first and second limit stop touch or contact each other, limits a relative movement of the knee lever device or a distance between the first and second free knee lever end. For example, the stop state can define a starting position for the knee lever device, from which the knee lever device can be moved to a different position and back. Preferably, the first limit stop unit can be designed as a bar having a lateral surface, which forms the first limit stop, which includes, for example, an angle of 90° with a middle axis of the associated knee lever. Preferably, the second limit stop unit can be formed by the associated knee, wherein the second limit stop can be formed by a lateral surface close to the first limit stop of the associated knee lever. Depending on the arrangement and design of the bar on the associated knee lever, a pre-defined angle between the first and second knee lever can be provided according to need as a starting position of the knee lever device. Preferably, the first limit stop unit can be provided to be fixed at the associated knee lever or in movable fashion and even more preferred in attachable fashion.

According to a preferred embodiment, the parking brake device comprises a locking and releasing device for locking the sliding element in a position different from the starting position and for releasing the locking mechanism. Especially preferred, the locking and releasing device comprises a shift lock magnet with an anchor, which can be at least partially extended when the shift lock magnet is supplied with power for engaging in an anchor receptacle coupled with the sliding element and which assumes an at least partially retracted position defining a non-engagement condition when the shift lock magnet is not supplied with power. As a result, the sliding element can be reliably retained in the position that differs from the starting position, thus preventing the parking lock from being unintentionally engaged.

Preferably, the anchor receptacle is formed by a limit stop unit protruding from an associated knee lever, wherein the anchor receptacle is preferably formed by a frontal drill hole at a free end of the limit stop unit. As a result, the locking and releasing device can be functionally combined with the limit stop device, thus requiring a lower number of components.

Especially preferred, the locking and releasing device is arranged in such a way that the sliding element can be locked in a first position with a maximum distance to the starting position or in a second position with a distance that is smaller than the maximum distance, especially preferred after passing through the first position. For example, the knee lever device can be designed to occupy an overextended position, to achieve which knee joint connection defining the vertex should pass over the movement axis of the relative movement, thus assuming an angle between the first and second knee lever of greater than 180°. At the same time, the sliding element initially passes through the first position, in which the sliding element has the greatest distance from its starting position, and then occupies the second position, in which the sliding element has the smallest distance from the starting position and can be locked. Alternatively, it is preferred when the sliding element can be locked in the first position and in the second position. For this purpose, the anchor of the shift lock magnet must be arranged in such a way that the anchor can assume and retain different positions of extension. In this way, it is possible to provide in a simple manner different locking positions for the sliding element.

According to a preferred embodiment, the parking brake device comprises a resetting device for resetting the second mechanical transmission element into its starting position. Preferably, the resetting device comprises at least one spring element, which supplies the second mechanical transmission element with a compressive or tensile force acting in the direction of the starting position. In this way, it can be ensured that the second mechanical transmission element can be reset into its starting position, as soon as an amount of the compressive or tensile force of the at least one spring element is greater than a counteracting force. For example, the counteracting force can involve the moving force for moving the second mechanical transmission element from the starting position or a retention force for retaining the second mechanical transmission element in a position that is different from the starting position. As a result, it is possible to provide an emergency function, by means of which a parking lock can be automatically engaged in the decoupling condition, to secure the motor vehicle in the decoupling condition from unintentionally rolling away when the parking brake device fails or malfunctions.

Preferably, the at least one spring element is formed by a compression or tension spring, which is coupled in spring-loaded manner with the second mechanical transmission element. A spring-loaded coupling involves a coupling in which the second mechanical transmission element is impinged with a spring force in each of the positions to be assumed. As a result, it is possible to ensure that a reliable resetting process can be performed from any position all the way up to the starting position. To implement a spring force impact, it is possible to use, besides the at least one spring element, for example, a retainer, which is connected with one end of the spring element, while the other end of the spring element is connected with the second mechanical transmission element. For example, the retainer can be provided in the form of a housing for receiving at least the second mechanical transmission element. In this case, the retainer can preferably be designed in the form of an attachment surface or attachment, which can be part of the wall of the housing or connected with the housing. Alternatively, the retainer can also be provided with a different component of the parking brake device, for example, with a shift lock magnet. At the same time, the retainer can also be designed as an attachment surface or attachment, which can be formed by or attached with a wall surface of the shift lock magnet.

Preferably, the coupling of the at least one spring element with the second mechanical transmission element can be performed via an attachment with the second mechanical transmission element or alternatively preferably via the intercalated component, which is coupled with the second mechanical transmission element. For example, the intercalated component can be the coupling device, to which the second mechanical transmission element is or can be mounted for a forcibly guided. Alternatively, the intercalated component can preferably be the decoupling device, in particular the knee lever device, which impacts the at least one spring element for resetting the knee joint connection. The resetting process comprises the transfer of a component or element from an assumed position to its original or starting position, from which the component or element has been moved to the assumed position. Preferably, the component or element can be repeatedly moved from the original or starting position to a different position, wherein in the original or idle position an amount of the exerted spring force is lowest or almost zero or zero.

According to a preferred embodiment, the parking brake device comprises a housing with a receiving space for receiving at least the coupling device, the decoupling device and the sliding element. Furthermore, the housing comprises a first passage leading to the receiving space for the first mechanical transmission element and a second passage leading to the receiving space for the second mechanical transmission element. The first and the second passage allow for unimpeded power transmission from the gear selector lever to the parking brake device via the first mechanical transmission element, as well as from the parking brake device to the parking lock via the second transmission element, wherein a coupling of the parking brake device with the first and second mechanical transmission element can occur within the housing. Furthermore, preferably, the housing can receive additional components according to the preferred embodiments described above.

Preferably, the housing can have a two-part design. At the same time, a first housing part can preferably be provided for receiving and the second housing part as a cover element for covering at least the receiving space. The cover element can be connected with the second housing part by means of customary connection types. Alternatively, in an assembled state, the first and second housing part preferably form the receiving space, wherein each housing part forms part of the receiving space.

By means of the housing, a modular parking brake device can be provided for an, especially subsequent, installation in a power transmission path between the gear selector lever and the parking lock.

According to a procedural aspect of the present disclosure, the method for manufacturing a parking brake device for a motor vehicle is proposed, wherein the motor vehicle comprises a vehicle transmission with a parking lock actuation and a gear selector lever coupled with the parking lock actuation, which can be moved into a parking lock position for engaging the parking lock, and it can be moved out of the parking lock position for disengaging the parking lock, wherein a first and second mechanical transmission element are arranged between the gear selector lever and the parking lock actuator, wherein the first mechanical transmission element is coupled with the gear selector lever for transmitting the movement of the gear selector lever and the second mechanical transmission element is coupled with the parking lock actuation for transmitting a movement of the first mechanical transmission element. The method comprises a step of providing a coupling device for transmitting the movement of the first mechanical transmission element to the second mechanical transmission element. Furthermore, the method comprises a step of providing a decoupling device for decoupling a connection between the coupling device and the first or second mechanical transmission element in the parking lock position of the gear selector lever. Furthermore, the method comprises a step of providing a sliding element for moving the second mechanical transmission element in relation to the first mechanical transmission element in the decoupling condition. The sequence of these procedural steps is not mandatory. The components described above can respectively involve a component according to any one of the above-mentioned preferred embodiments.

Furthermore, the method comprises a step of arranging the coupling device, the decoupling device and the sliding element for connecting the coupling device with the first and second mechanical transmission element, the decoupling device with the connection between the coupling device and the first and second mechanical transmission element and the sliding element with the coupling device.

By means of this method, it is possible to provide a parking brake device according to any one of the preferred embodiments.

Optionally, the step of arranging can be succeeded by a step of connecting the coupling device with the first and second mechanical transmission element, the decoupling device with the coupling between the coupling device and the first and second mechanical transmission element and the sliding element with the coupling device. In this way, it is possible to provide a parking brake device that has already an active connection.

Furthermore, the method can comprise an optional step of providing a housing for receiving at least the coupling device, the decoupling device and the sliding element. Preferably, this procedural step takes place prior to the step of arranging. In this way, the individual components can already be arranged in the housing and then be coupled with each other in the housing. At the same time, the step of providing the housing can be performed in any sequence with the other procedural steps of providing the other components. The housing can be designed according to any one of the preferred embodiments described above.

According to a further procedural aspect, a method for disengaging a parking lock of a motor vehicle by means of a parking brake device according to any one of the preferred embodiments is being proposed. The motor vehicle comprises a vehicle transmission with a parking lock actuation and a gear selector lever coupled with the parking lock actuation, which can be moved into a parking lock position for engaging the parking lock, and which can be moved out of the parking lock position for disengaging the parking lock, wherein a first and second mechanical transmission element are arranged between the gear selector lever and the parking lock actuator, wherein the first mechanical transmission element is coupled with the gear selector lever for transmitting the movement of the gear selector lever and the second mechanical transmission element is coupled with the parking lock actuation for transmitting a movement of the first mechanical transmission element. The method comprises a step of decoupling a connection between the coupling device and the first or second mechanical transmission element by means of the decoupling device in the parking lock position of the gear selector lever and a step of moving the second mechanical transmission element in relation to the first mechanical transmission element in the decoupling condition until the parking lock is released. As a result, it is possible with just a few procedural steps to disengage the parking lock without moving the gear selector lever out of the parking lock position.

Further characteristics and advantages of the present disclosure are included in the following description of preferred embodiments of the present disclosure, the figures and drawings, which show relevant details, and the claims. Each of the different characteristics can be implemented on an individual basis or in a plurality in any combination with a preferred embodiment.

BRIEF DESCRIPTION OF THE DRAWINGS

Subsequently, preferred embodiments of the present disclosure are described in more detail by means of the enclosed figures. It is shown.

In the following description of preferred embodiments of the present disclosure, the same or similar reference numerals are used for the similarly acting elements shown in the different figures, wherein a repeated description of these elements is relinquished.

DETAILED DESCRIPTION

Figure 1:
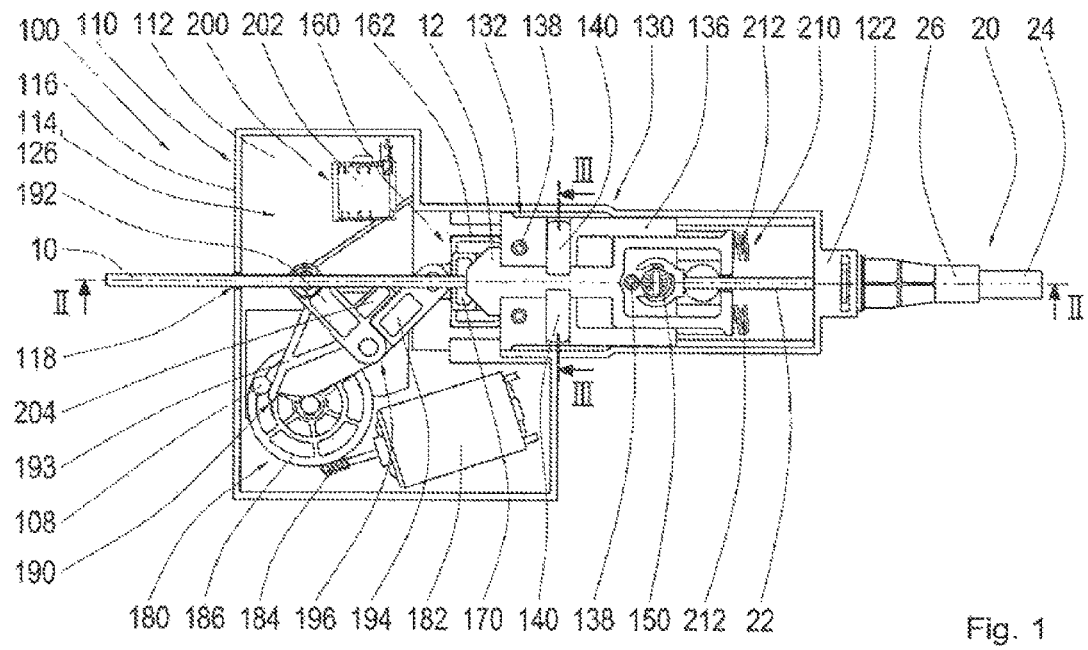
FIG. 1: schematic top view on a housing part of a parking brake device according to a preferred embodiment in starting position.
Figure 2:
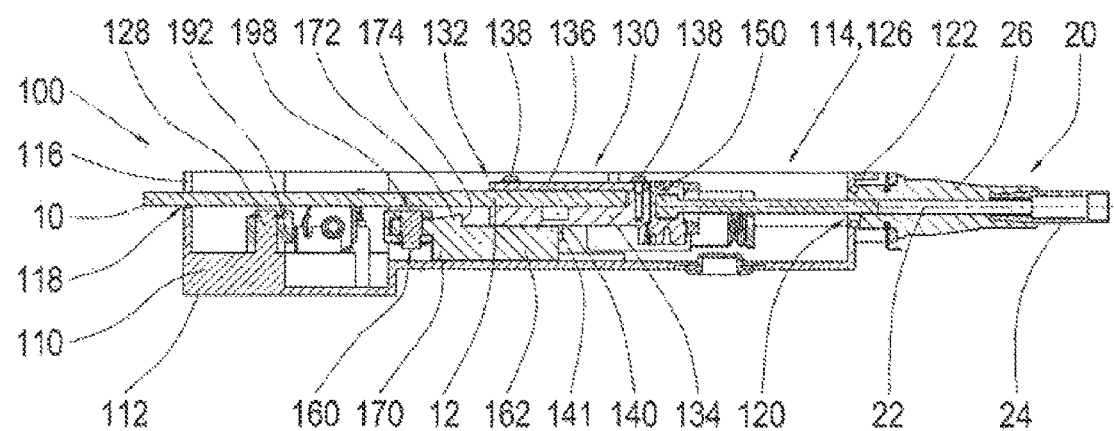
FIG. 2: a sectional view along the intersection line II-II of the parking brake device shown in FIG. 1.

FIG. 1 shows a schematic top view on a housing part 110 of a parking brake device 100 according to a preferred embodiment, wherein the parking brake device 100 is in starting position. FIG. 2 sows a sectional view along the intersection line II-II of the parking brake device 100 and FIG. 3 a sectional view along the intersection line III-III.

The housing part 110 is designed in the form of a tray and has a housing floor 112, a housing opening 114, which is located opposite of the housing floor 112 and a housing wall 116, which protrudes from the housing floor 112 and which restricts the housing opening 114. The housing opening 112 can be covered with a housing cover, which can be detachably mounted on the housing part 110 by means of customary connection means, for example, a snap-on, clamp, plug, screw or similar connection. As a result, an interior space of the housing part 110 closed or sealed to be protected against external influences.

On one side, the housing wall 116 has a first housing passage 118 in the form of a recess for a first mechanical transmission element 10. The first mechanical transmission element 10 is connected on one end (not shown) with a gear selector lever of a motor vehicle, which can be moved between different gear stages. The first mechanical transmission element 10 according to this preferred embodiment is arranged to transmit a moving force emanating from the gear selector lever at least for engaging a parking lock of a vehicle transmission. For this purpose, the first transmission element 10 according to this preferred embodiment is designed in the form of a tension and pressure rod. According to an alternatively preferred embodiment, the first mechanical transmission element 10 is designed in the form of one or multiple cable pull mechanisms. The first mechanical transmission element 10 can be moved freely, or unimpeded, in the first housing passage 118 at least in power transmission direction, which extends parallel to a longitudinal axis of the first mechanical transmission element 10.

On a side located opposite to the first housing passage 118, the housing wall 116 has a second housing passage 120 in the form of a drill hole for a second mechanical transmission element 20. The second mechanical transmission element 20 is connected on a free end (not shown) with the parking lock of the vehicle transmission. The second mechanical transmission element 20 is arranged to transmit a moving force emanating from the first mechanical transmission element 10 to the parking lock at least for engaging the parking lock. Furthermore, the second transmission element 20 is arranged to transmit a force for disengaging the parking lock. For this purpose, the second mechanical transmission element 20 according to this embodiment is designed in the form of a cable pull mechanism. The cable pull mechanism 20 comprises a cable pull core 22, which is covered by a cable pull sleeve 24, in which the cable pull core 22 can freely move. In an area of the second free end of the cable pull mechanism 20, the cable pull mechanism comprises a cable pull counter bearing 26, which is attached on a free end of the cable pull sleeve 24 and which comprises a passage for the cable pull core 22 for a free movement of the cable pull core 22 in relation to the cable pull counter bearing 26. The cable pull counter bearing 26 is mounted on a housing attachment 122, which is externally arranged on the housing wall 116 in the area of the second housing opening 120. As a result, the cable pull core 22 can move freely within the cable pull sleeve 24 and the cable pull counter bearing 26 in relation to these. The cable pull core 22 can freely move in the second housing passage 120, at least in power transmission direction, which extends parallel to a longitudinal axis of the cable pull core 22.

The first 10 and the second mechanical transmission element 20 are coupled with each other inside the housing part 110 via a coupling device 130. The interior space 126 of the housing part 110 forms a receiving space for receiving the coupling device 130. The coupling device 130 comprises a coupling member 132 with a base plate 134 and a cover plate 136, which covers at least partially the base plate 134. The cover plate 136 is connected with the base plate 134 by means of screw attachments 138. Between the base plate 134 and the cover plate 136, the coupling member 132 has a molded part receptacle for a molded part 12, which is fixed at the first mechanical transmission element 10 and which defines a free end for the first mechanical transmission element 10. In the molded part receptacle, the molded part 12 is movably retained along a power transmission direction by a moving force to be transmitted from the first mechanical transmission element 10 the second mechanical transmission element 20. According to this preferred embodiment, the molded part 12 has an H-shaped design at least in a section, wherein the interior areas or surfaces located opposite of each other respectively form attachment surfaces for the coupling member 132. As a result, a distance of these internal areas defines a relative movement path between the molded part 12 and the coupling member 132. The distance of these internal areas corresponds to a length of the center bar of the H-shape. Correspondingly, the coupling member 132 has attachment areas of attachment surfaces directed to the outside that respectively attach to the internal areas or surfaces of the molded part 12. The respective areas or surfaces provided for attaching to the molded part 12 or the coupling member 132 define a stop, depending on a movement direction, for a relative movement between molded part 12 and coupling member 132.

Figure 3:
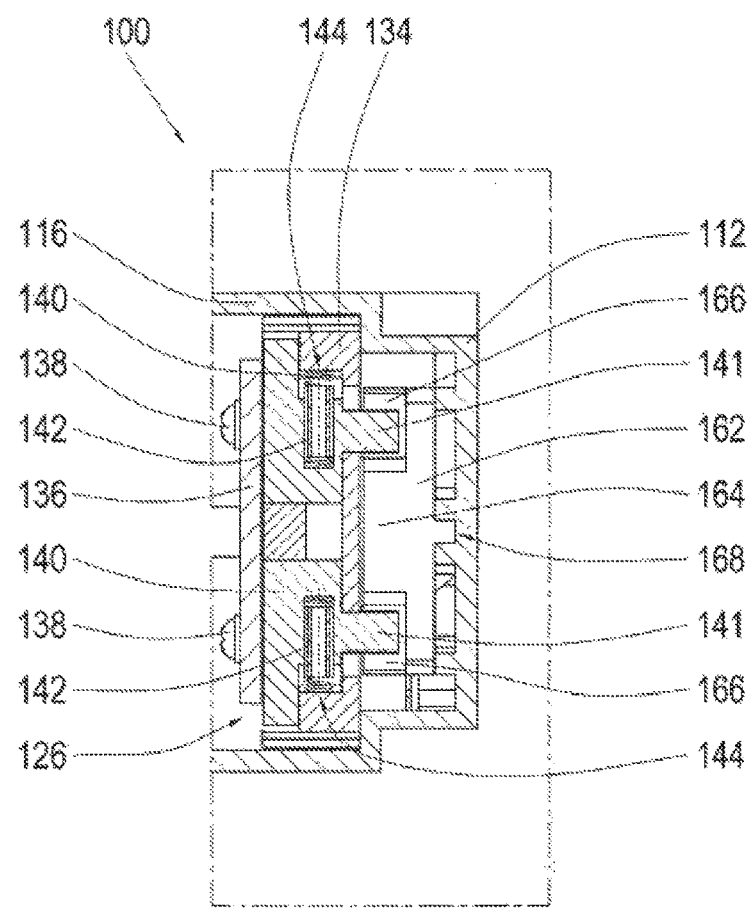
FIG. 3: a sectional view along the intersection line III-III of the parking brake device shown in FIG. 1.

The coupling member 132 is coupled with the molded part 12 by means of an engagement means. The engagement means comprise two opposite, spaced passages for respectively receiving an engagement member 140 moving in the passage, wherein the passages with the coupling member 132 are shaped. The engagement members 140 associated with the engagement means are movably retained by the coupling member 132, in preloaded fashion to the coupling member 132, transverse to the relative movement direction of the molded part 12. According to this preferred embodiment, a spring element 142 is arranged between the engagement member 140 and a spring system 144, which is formed together with the base plate 134 (FIG. 3). The spring element 142 is received in a drill hole of the engagement member 140, wherein, in mounted condition of the engagement member 140, the drill opening is located opposite the coupling member 132 of the spring system 144. In uncompressed condition, the spring element 142 is designed to protrude from the drill hole and, in mounted condition, it is designed to exert a spring pressure on the engagement member 140.

Furthermore, the engagement means comprise for each engagement member 140 an engagement receptacle 304

(shown in FIG. 5), in which the engagement member 140 engages in flexibly preloaded fashion with its front end by means of the spring element 142. The engagement receptacles 304 are shaped with the molded part 12.

The engagement of the engagement members 140 in the molded part 12 transverse to a relative movement direction of the first mechanical transmission element 10 and the coupling member 132 allows for a reliable and durable coupling between the first mechanical transmission element 10 or the molded par 12 and the coupling device 130 or the coupling member 132 along the relative movement direction. Therefore, in an engaged condition of the engagement means, the coupling allows for a mutual movement of the first mechanical transmission 10 and the coupling device 130.

Furthermore, the coupling device 130 comprises an attachment 150 for a free end of the second mechanical transmission element 20, especially for a free end of the cable pull core 22. The attachment 150 is arranged in an end section of the coupling member 132 facing the second mechanical transmission element 20. The attachment 150 allows for a transmission of the moving force emanating from the coupling member 132 and being exerted on the second mechanical transmission element 20. As a result, a moving force can be transmitted between the first mechanical transmission element 10 and the second mechanical transmission element 20.

Furthermore, the parking brake device 100 comprises a decoupling device 160 for decoupling the coupling between the coupling device 130 and the first mechanical transmission element 10. The decoupling device 160 is arranged in the receiving space 126 of the housing part 110. The decoupling device 160 comprises a decoupling member 162, which is arranged between the housing floor 112 and the coupling member 132 and which can be moved along a movement axis (shown as movement axis 302 shown in FIG. 5) of the coupling member 132. The decoupling member 162 comprises a tapered V-shaped end with a blunt tip 164 pointing to the coupling member 132. The blunt form of the tip facilitates a reduction of the dimension of the decoupling member 162 along its movement axis. The legs 166 of the V-shape, which are respectively extending transverse to the movement axis of the decoupling member 162, respectively form a sliding surface for glidingly attaching to a sliding component 141, which is formed with the engagement member 140, in particular in one piece, and which protrudes from the engagement member transverse to the moment axis of the engagement member 140. By means of a relative movement between the decoupling member 162 and the coupling member 132, the sliding surface 166 attaches to the sliding component 141 and guides the engagement member 140, which is connected to the sliding component 141, out of its engagement with the molded part 12 when the relative movement is continued, thus releasing the coupling between the first mechanical transmission element 10 and the coupling device 130. As a result, the coupling member 132 can be freely moved in the non-engaged condition of the engagement member 140, along the movement axis of the coupling member 132, independent of the first mechanical transmission element 10.

Furthermore, the coupling device 130 comprises a sliding element 170 for moving the second mechanical transmission element 20 in relation to the first mechanical transmission element 10 in the decoupling condition to release the parking lock. The sliding element 170 is arranged in the receiving space 126 between the first mechanical transmission element 10 and the housing floor 112. According to this preferred embodiment, the sliding element 170 is formed in one piece with the decoupling member 162, wherein the sliding element 170 is located opposite the V-shaped end. The sliding element 170 and the decoupling member 162 are guided in translational manner to be moved on the housing floor 112. In the receiving space 126, the housing floor 112 has a linear guidance 113, which engages in the sliding element 170 and the coupling member 162. The guidance 113 and the sliding element 170 or the decoupling member 162 are coupled by means of a groove and tongue system 168. Thus, the sliding element 170 can be moved in linear fashion with the decoupling member 162.

The sliding element 170 comprises a projection 172 for attaching to the coupling member 132. The projection 172 protrudes on a surface of the sliding element 170 facing away from the housing floor 112. On a side facing the coupling member 132, the projection 172 forms an attachment area or attachment surface 174 for an attachment with a frontal end of the coupling member 132.

FIG. 1 and FIG. 2 show the sliding element 170 in the starting position of the parking brake device, which defines a starting position for the sliding element 170. In the starting position of the sliding element 170, the attachment surface 174 is spaced with regard to the opposite frontal end of the coupling member 132.

According to this preferred embodiment, the sliding element 170 and thus also the decoupling member 162 can be moved or driven via a drive unit 180, which is arranged in the receiving space 126. The drive unit 180 comprises an actuator 182 with a worm 184 and a worm wheel 186 which is coupled at the driving end with the worm 184. The worm wheel 186 comprises a tappet 188 in the form of a pin, which protrudes from the radial surface of the worm wheel 186.

Furthermore, the drive unit 180 comprises a knee lever device 190, which is arranged in the receiving space 126 between the worm wheel 186 and a free end of the sliding element 170. The knee lever device 190 comprises a first knee lever 192 and a second knee lever 194, which is flexibly connected via a knee joint connection 196 with the first knee lever 192. The knee joint connection 196 is composed of a pin and a pin hole, in which the pin engages in rotary fashion. In this preferred embodiment, the pin is provided in an exemplary manner at the free end of the second knee lever 194, while the pin hole is designed at an assigned free end of the first knee lever 192. The longitudinal axis of the pin or the center axis of the pin hole define a rotational axis, about which the first 192 and second knee lever 194 are rotating in relation to each other.

With the free end located opposite of the knee joint connection 196, the first knee lever 192 is rotatably mounted in the housing part 110. The other free end has an opening, in which housing pin 128 engages, which is formed in the housing floor 112. As a result, the knee lever device 190 is rotatably mounted about a fixed rotational axis, wherein the rotational axis is defined by the longitudinal axis of the housing pin 128. Furthermore, the first knee lever 192 comprises a boom 193, which protrudes from between the free ends of the first knee lever 192 in the direction of the worm wheel 188. In the starting position of the parking brake device 100, the boom 193 extends into the rotation distance of the tappet 188. The boom 193 has a sliding surface, along which the tappet 188 can slide during a rotational movement of the worm wheel 186, as a result of which the boom 193 and the knee lever device 190 can be forcibly moved during the rotational movement. At the same time, the knee joint connection 196 can be moved on a circular path about the fixed rotational axis of the knee lever device 190.

With its other free end, which is located opposite the knee joint connection 196, the second knee lever 194 is connected with the sliding element 170. The connection is made by means of a pivot joint 198, which can be moved in linear fashion with the sliding element 170 and which defines a rotational axis for the second knee lever 194, about which the knee lever 194 rotates during a movement of the knee joint connection 196. By means of the knee lever device 190m the rotary drive of the worm wheel 186 can be converted to a linear drive for the sliding element 170.

According to this preferred embodiment, the parking brake device 100 comprises a locking and releasing device 200 for locking the sliding element 170 in a position different from the starting position and for releasing the locking mechanism. The locking and releasing device 200 is arranged in the receiving space 126 and comprises a shift lock magnet 202 with an anchor 203, which can be extended when the shift lock magnet 202 is supplied with power for engaging in an anchor receptacle 204 coupled with the sliding element 170 and which assumes a non-engagement condition defining position when the shift lock magnet 202 is not supplied with power. The anchor receptacle 204 is arranged at the first knee lever 192 and protrudes in linear fashion from a side of the first knee lever 192 facing away from the drive unit 180. The anchor receptacle 204 has a drill hole, into which the anchor 203 of the shift lock magnet 202 engages in extended condition.

The anchor receptacle 204 forms a limit stop device with the second knee lever 194 for limiting the movement of the knee joint connection 196. The anchor receptacle 204 comprises an attachment surface for the second knee lever 194, which faces the second knee lever 194. At the same time, the anchor receptacle 204 is arranged at the first knee lever 192 in such a way that the knee lever device 190 assumes a starting position at an angular position of 90° between the first 192 and the second knee lever 194 (shown in an exemplary manner in FIG. 1), out of which and into which the knee lever device 190 can be moved. Therefore, a dimension of the linear movement path of the sliding element 170 depends on the enclosed angle between the first 192 and second knee lever 194 at the starting position of the knee lever device 190. The smaller the enclosed angle at the starting position, the greater the possible linear movement path of the sliding element 170.

The locking and releasing device 200 allows for locking and retaining the sliding element 170, as well as releasing according to need or in a case of emergency the sliding element 170 and the associated component(s) in a position different from the starting position of the sliding element 170, in which the parking lock is disengaged.

According to one preferred embodiment, the drive unit 180 and the locking and releasing device 200 is electrically connected with a control and regulating device (not shown), which controls and regulates the drive unit 180 and the locking and releasing device 200. For example, the control and regulating device can be part of the parking assistance system, which is arranged for parking the motor vehicle autonomously.

Furthermore, the parking brake device 100 comprises a resetting device 210 for resetting the second mechanical transmission element 20 to its starting position, in which the parking lock of the vehicle transmission was engaged. FIG. 1 shows a preferred embodiment of the resetting device 210. The resetting device 210 comprises two compression springs 212, which are arranged between the housing wall 116 in the area of the second housing passage 120 and the coupling device 130. The compression springs 212 are indicated in FIG. 1. According to this embodiment, the compression springs 212 extend contrary to the display all the way up to the opposite housing wall 116 in the area of the second housing passage 120.

FIG. 2 shows a further preferred embodiment of the resetting device 210. In contrast to FIG. 1, both compression springs 212 are arranged between a spring system connected 117 connected with the housing wall 116 and the coupling device 130. The housing spring system 117 is formed by a projection for supporting the compression springs 212, which protrudes from the housing wall 116 or the housing floor 112 into the receiving space 126. According to a preferred embodiment, a projection can be provided for each compression spring 212 or a mutual projection can be provided for both compression springs 212. As a result, it is possible to use shorter and therefore more cost-effective compression springs for the resetting device 210. Furthermore, the housing spring system 117 can be designed in a cost-effective manner in one procedural step with the housing part 110. For example, the housing part 110 can be made out of an injection-molded plastic material.

According to a further embodiment, less or more than two compression springs 212 are provided.

The resetting device 210 allows for automatically resetting the second mechanical transmission element 20, as soon as an amount of the compressive force in the direction of the starting position of the second mechanical transmission element 20 is greater than a counter-acting force. As a result, the parking lock can be automatically engaged. Therefore, it is possible to provide an emergency function, in which the parking lock is automatically engaged and the motor vehicle is protected from rolling away when the parking brake device is disconnected.

Figure 10:
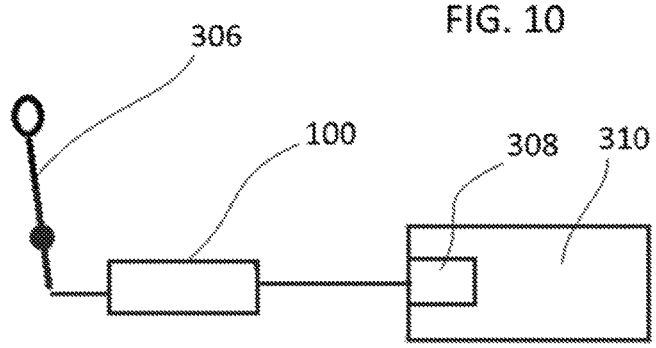
FIG. 10 shows an example arrangement with a parking brake device, a gear selector lever, a parking lock, and a vehicle transmission.

FIG. 1 shows the parking brake device 100 in a starting position, in which the parking lock in the vehicle transmission is engaged. In this starting position, the gear selector lever is usually in parking lock position, wherein the gear selector lever can be locked in this position. The starting position of the parking brake device 100 also defines a starting position for components associated with the parking brake device 100 and coupled with the parking brake device 100. FIG. 10 shows an example arrangement with a parking brake device 100, a gear selector lever 306, a parking lock 308, and a vehicle transmission 310.

Figure 4:
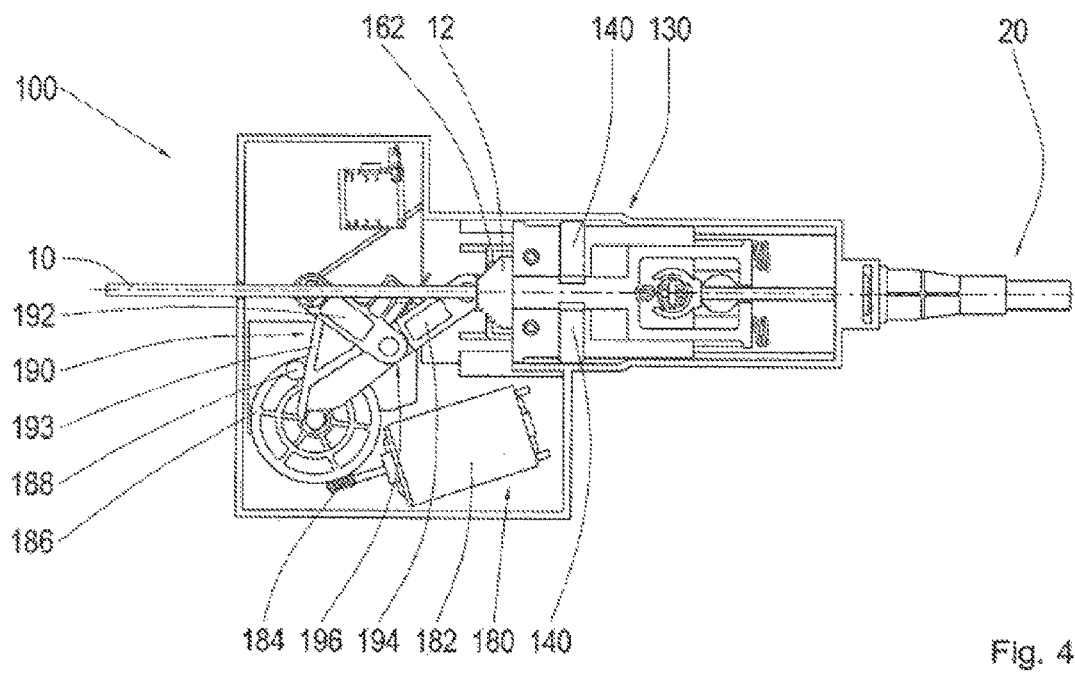
FIG. 4: a schematic top view on a housing part of the parking brake device shown in FIG. 1 in a first position of actuation.

FIG. 4 shows a schematic top view on the housing part 110 of the parking brake device 100, shown in FIG. 1, which is located in a first position of actuation, which when reached results in releasing the coupling between the coupling device 130 and the first mechanical transmission element 10. The first position of actuation corresponds to a decoupling condition of the decoupling device 160. To reach the first position of actuation, the worm wheel 186 with the tappet 188 must be rotated as predetermined in clockwise direction by the actuator 182, which results in actuating the knee lever device 190 and moving the knee joint connection 196 on its circular path. The displacement results in a linear displacement of the sliding element 170 and the decoupling member 162 in the direction of the second mechanical transmission element 20. As a result, the sliding surfaces 166 of the decoupling member 162 come into sliding contact with the sliding components 141 of the engagement members 140 and the engagement members 140 are released from the engaged condition with the molded part 12 in the decoupling or non-engagement condition.

Figure 5:
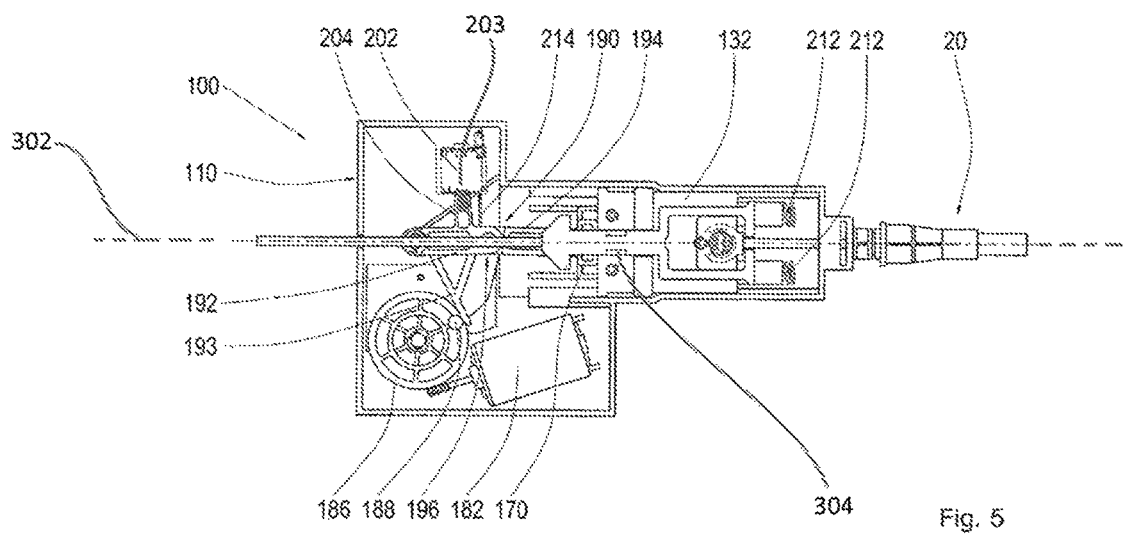
FIG. 5: a schematic top view on a housing part of the parking brake device according to a preferred embodiment in a second position of actuation.

FIG. 5 shows a schematic top view on the housing part of a parking brake device 100 according to a preferred embodiment, which is in a second position of actuation, which resulted when reached in a disengagement of the parking lock of the vehicle transmission. The parking brake device 100 according to this preferred embodiment differs from the one described above by the design of the resetting device 210. The resetting device 210 according to this embodiment has a further compression spring 214, which is arranged between the shift lock magnet 202 and the knee lever device 190 and which impinges the knee joint connection 196 in the second position of actuation with a compressive force. The further compression spring 214 supports a release of the locking mechanism when the connection between the shift lock magnet 202 and the anchor receptacle 204 is released by pushing back the knee joint connection 196 in the direction of the starting position at least to the angular position of lower than 180° between the first 192 and second knee lever 194. When this angular position is reached, the knee lever device 190 is moved back to the starting position by the compressive forces exerted by the compression springs 212.

Starting from the first position of actuation, the second position of actuation is reached by continuing to rotate the worm wheel 186 as predetermined in clockwise direction through the operation of the actuator 182. As a result, the tappet 188, which forcibly moves the boom 193, is carried along, thus moving the knee joint connection 196 on its circular path. In the second position of actuation, the knee lever device 190 assumes an overextended position. In this context, overextended means that the angle enclosed between the first 192 and second knee lever 194 passes during actuation through an angle of 180° and when the second position of actuation is reached, it has an angle greater than 180°. The overextended position ensures a reliable support for the sliding element 170. When assuming the overextended position, the sliding element 170 reaches its end position. During the movement of the sliding element 170, the attachment surface 174 comes in contact with the base plate 134 of the coupling member 132, thus carrying along the coupling member 132 when the movement of the siding element 170 is continued. In the process, the second mechanical transmission element 20 is also moved, thus transferring the parking lock from an active or engaged condition to a non-active or disengaged condition. In this condition, the vehicle transmission can be shifted into a gear stage that differs from the parking lock stage, for example, D for forward drive mode or R for reverse drive mode. For example, the process of shifting the vehicle transmission can be controlled by means of the parking assistance system.

While or after reaching the overextended position of the knee lever device 190, in which the anchor receptacle 204 arrives at the scope of action of the shift lock magnet 202, the knee lever device 190 is set by energizing the shift lock magnet 202, wherein the anchor 203 is triggered by means of the power supply to extend and engages in the anchor receptacle 204. As a result, it is possible to retain in reliable fashion the second mechanical transmission element 20 in a released condition of the parking lock.

Figure 6:
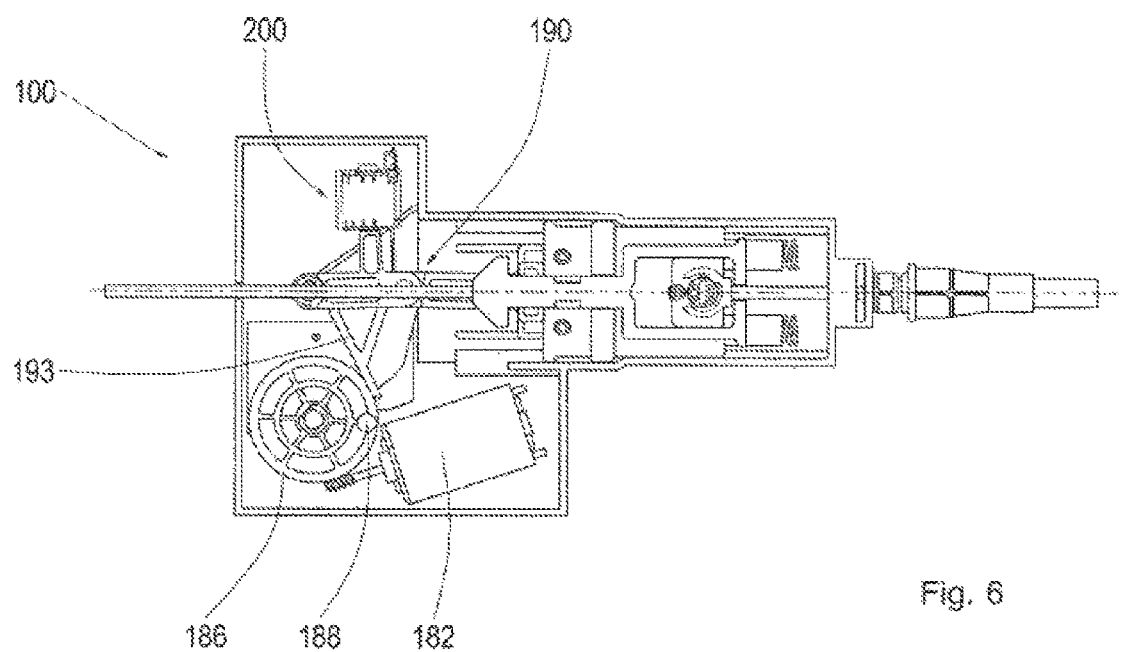
FIG. 6: a schematic top view on a housing part of the parking brake device shown in FIG. 5 in a third position of actuation.

FIG. 6 shows a schematic top view on the housing part 110 of the parking brake device 100 shown in FIG. 5 in a third position of actuation, in which the tappet 188 and the boom 193 are not in contact. Starting from the second position of actuation, the third position of actuation is reached by rotating the worm wheel 186 in clockwise direction or, according to an alternatively preferred embodiment, in counter-clockwise direction by operating the actuator 182. Through the locking and releasing device 200, the knee lever device 190 remains in the overextended position, which results in the fact that the parking lock continues to be released when the third position of actuation is reached.

Figure 7:
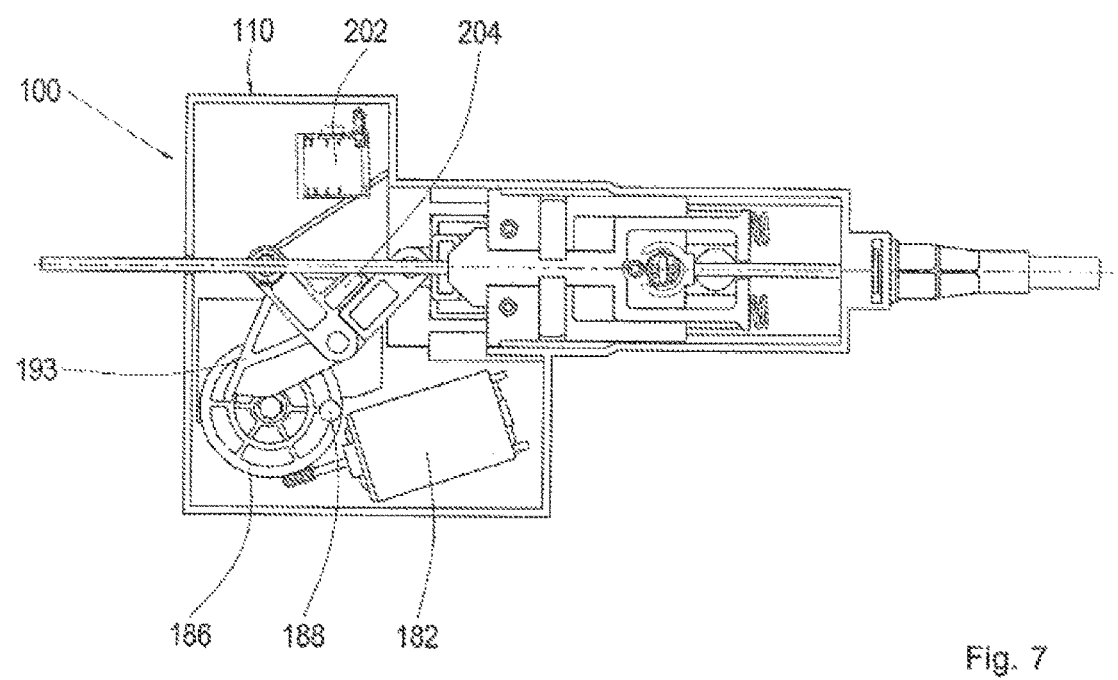
FIG. 7: a schematic top view on a housing part of the parking brake device shown in FIG. 1 in a fourth position of actuation.

FIG. 7 shows a schematic top view on the housing part 110 of the parking brake device 100 shown in FIG. 1 in a fourth position of actuation, in which the components of the parking lock device have assumed the starting position, except for the drive unit 180. Starting from the third position of actuation, the fourth position of actuation can be reached by retracting the anchor 203 of the shift lock magnet 202. According to this embodiment, the anchor 203 is retracted by placing the shift lock magnet 202 into a de-energized state. For example, this state can also be enforced when a power supply unit fails, which is provided for supplying the shift lock magnet 202 with power. In this way, the parking brake device can be provided with an emergency function, which causes the parking brake device to automatically engage the parking lock. For example, in the event that the parking assistance system is defective, it is possible to automatically secure the motor vehicle from unintentionally rolling away.

Starting from the fourth position of actuation, for assuming the starting position for the parking brake device 100, the worm wheel 186 must be rotated by operating the actuator 182 in such a way that the tappet 188 is brought into the position shown in an exemplary manner in FIG. 1. In principle, in a starting position of the parking brake device 100, the tappet 188 can assume a position, in which the tappet 188 attaches to the boom 193, preferably without force, but at least in such a way that the parking lock remains in engaged condition, or that it is spaced from the boom 193.

Figure 8:
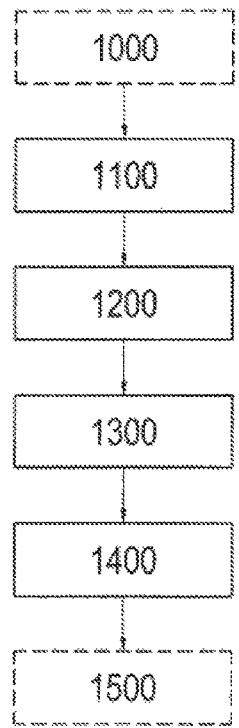
FIG. 8: a flow diagram of a method for manufacturing a parking brake device according to a preferred embodiment

FIG. 8 shows a flow diagram of a method for manufacturing a parking brake device according to a preferred embodiment, wherein the parking lock device can involve any one of the embodiments described above. The method comprises a step 1100 of providing a coupling device for transmitting a moving force emanating from the first mechanical transmission element to the second mechanical transmission element, wherein the coupling device can be arranged between the first and second mechanical transmission element and can be coupled with the first and second mechanical transmission element. Furthermore, the method comprises a step 1200 of providing a decoupling device for decoupling a connection between the coupling device and the first or second mechanical transmission element in the parking lock position of the gear selector lever, as well as a step 1300 of providing a sliding element for moving the second mechanical transmission element in relation to the first mechanical transmission element in the decoupling condition. The sequence of these procedural steps 1100, 1200, 1300 is not mandatory. The previously described components can involve a respective component according to any one of the previously described preferred embodiments. For example, it is possible to manufacture a parking brake device according to any one of the preferred embodiments.

Furthermore, the method comprises a step 1400 of arranging the coupling device, the decoupling device and the sliding element for connecting the coupling device with the first and second mechanical transmission element, the decoupling device with the connection between the coupling device and the first and second mechanical transmission element and the sliding element with the coupling device.

Optionally, the step 1400 of arranging can be succeeded by a step 1500 of connecting the coupling device with the first and second mechanical transmission element, the decoupling device with the coupling between the coupling device and the first and second mechanical transmission element, and the sliding element with the coupling device. In this way, it is possible to provide a parking brake device that has already an active connection.

Furthermore, the method can comprise an optional step 1000 of providing a housing for receiving at least the coupling device, the decoupling device and the sliding element. Preferably, this procedural step 1000 takes place prior to the step of arranging. In this way, the individual components can already be arranged in the housing and then be coupled with each other in the housing. At the same time, the step 1000 of providing the housing can be performed in any sequence with the other procedural steps 110, 1200, 1300 of providing the other components. The housing can be designed according to any one of the preferred embodiments described above.

Figure 9:
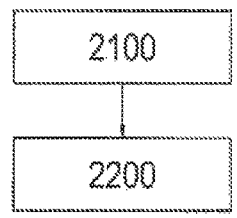
FIG. 9: a flow diagram of a method for disengaging a parking lock by means of a parking brake device according to a preferred embodiment.

FIG. 9 shows a flow diagram of a method for disengaging a parking lock by means of a parking brake device according to a preferred embodiment. The method comprises a step 2100 of decoupling a connection between the coupling device and the first and second mechanical transmission element by means of the decoupling device in the parking lock position of the gear selector lever, as well as a step 2200 of moving the second mechanical transmission element in relation to the first mechanical transmission element in the decoupling condition until the parking lock is released. In this way, it is possible to release in a simple manner the parking lock, independent of actuating the gear selector lever.

The preferred embodiments show that it is possible to provide a parking brake device that is especially suitable for a parking assistance system used for autonomously parking a motor vehicle which, among other things, can be provided as a modular component that can be subsequently installed, and which also have a simple and compact construction.

The embodiments described and shown in the figures have been selected only as examples. Different embodiments can be combined as a whole or with respect to particular characteristics. It is also possible to complement an embodiment with characteristics of a different embodiment.

It is also possible to repeat disclosure-based procedural steps or perform them is a sequence that differs from the sequence described.

If an embodiment comprises an "and/or" combination between a first and a second characteristic, this can be read in such a way that according to one embodiment the example comprises the first characteristic, as well as the second characteristic and, according to a further embodiment, the example comprises only the first characteristic or only the second characteristic.

REFERENCE NUMERALS 10 first mechanical transmission element
12 molded part
20 second mechanical transmission element
22 cable pull core
24 cable pull sleeve
26 cable pull counter bearing
100 parking brake device
110 housing part
112 housing floor
114 housing opening
116 housing wall
117 housing spring system
118 first housing passage
120 second housing passage
122 housing attachment
126 receiving space
128 housing pin
130 coupling device
132 coupling member
134 base plate
136 cover plate
138 screw attachment
140 engagement member
141 sliding component
142 spring element
144 spring system
150 attachment
160 decoupling device
162 decoupling member
164 tip
166 sliding surface
170 sliding element
172 projection
174 attachment surface
180 drive unit
182 actuator
184 worm
186 worm wheel
188 tappet
190 knee lever device
192 first knee lever
193 boom
194 second knee lever
196 knee joint connection
198 pin joint
200 locking and releasing device
202 shift lock magnet
203 anchor
204 anchor receptacle
210 resetting device
212 compression spring
214 additional compression spring
302 movement axis
304 engagement receptacle
306 gear selector lever
308 parking lock
310 vehicle transmission
1000 step of providing a housing
1100 step of providing a coupling device
1200 step of providing a decoupling device
1300 step of providing a sliding element
1400 step of arranging
1500 step of coupling
2100 step of decoupling
2200 step of moving

The invention claimed is:

1. A parking lock device for a motor vehicle, comprising:
a vehicle transmission including a parking lock and a gear selector lever coupled with the parking lock,
wherein the gear selector lever is movable into a parking lock position for engaging the parking lock, and
wherein the gear selector lever is movable out of the parking lock position for disengaging the parking lock,
wherein a first mechanical transmission element and a second mechanical transmission element are arranged between the gear selector lever and the parking lock, and
wherein the first mechanical transmission element is connected with the gear selector lever and configured for transmitting a moving force emanating from the gear selector lever to the second mechanical transmission element, and wherein the second mechanical transmission element is connected with the parking lock for transmitting a moving force emanating from the first mechanical transmission element to the parking lock;

a coupling device configured to couple with at least one of the first mechanical transmission element and the second mechanical transmission element, wherein the coupling device is movable along a movement axis for transmitting the moving force emanating from the first mechanical transmission element to the second mechanical transmission element;

a decoupling device for transitioning the coupling device into a decoupled state by decoupling the coupling device from at least one of the first mechanical transmission element and the second mechanical transmission element when the gear selector lever is in the parking lock position; and a sliding element for moving the second mechanical transmission element in relation to the first mechanical transmission element in the decoupled state for releasing the parking lock.

2. The parking lock device of claim 1, wherein the coupling device is detachably coupled with one of the first mechanical transmission element and the second mechanical transmission element with at least one engagement member that is movable in an engagement receptacle in a direction transverse to the movement axis, and wherein the engagement member is fixed with the other of the first mechanical transmission element and the second mechanical transmission element.

3. The parking lock device of claim 2, wherein the decoupling device includes a movable decoupling member for moving the engagement member into a non-engaged state.

4. The parking lock device of claim 3, wherein the decoupling member is movable along the movement axis and has a sliding surface, wherein a sliding component is fixed with the engagement member and is movable along the sliding surface, and wherein the sliding surface extends transverse to the movement axis of the engagement member.

5. The parking lock device of claim 4,
wherein the decoupling member and the sliding element form a constructional unit,
wherein the sliding element includes an attachment surface that is couplable with the coupling device, and
wherein the sliding surface is positioned upstream of the attachment surface in a sliding direction such that, when moving the constructional unit, the engagement member can be moved into the non-engaged state and then the coupling device is movable.

6. The parking lock device of claim 1, further comprising at least one drive unit for driving the decoupling device and the sliding element.

7. The parking lock device of claim 6, wherein the drive unit includes a worm gear with a worm and a worm wheel coupled with the worm, wherein the worm wheel includes a tappet for driving a knee lever device, and wherein the knee lever device is coupled with the decoupling device and the sliding element.

8. The parking lock device of claim 7, wherein the knee lever device includes a first knee lever and a second knee lever, wherein the first knee lever and the second knee lever are connected with each other via a knee lever joint connection, wherein the first knee lever comprises a boom with a second sliding surface along which the tappet can slide, and wherein the second knee lever is coupled with the decoupling device and the sliding element.

9. The parking lock device of claim 1, further comprising a locking and releasing device for locking the sliding element in a position different from a starting position and for releasing the sliding element.

10. The parking lock device of claim 9, wherein the locking and releasing device includes a shift lock magnet with an anchor, wherein the anchor extends when the shift lock magnet is supplied with power for engaging in an anchor receptacle coupled with the sliding element, and wherein the anchor assumes a non-extended position when the shift lock magnet is not supplied with power.

11. The parking lock device of claim 1, further comprising a resetting device for resetting the second mechanical transmission element into a starting position.

12. A method for disengaging a parking lock of a motor vehicle by using the parking lock device according to claim 1, the method comprising:
decoupling the coupling device from at least one of the first mechanical transmission element and the second mechanical transmission element with the decoupling device when the gear selector lever is in the parking lock position; and
moving the second mechanical transmission element in relation to the first mechanical transmission element when the coupling device is in the decoupled state until the parking lock is released.

13. A method for manufacturing a parking lock device for a motor vehicle, the method comprising:
arranging a coupling device between a first mechanical transmission element and a second mechanical transmission element, where the coupling device is configured for transmitting a movement of the first mechanical transmission element to the second mechanical transmission element, wherein the coupling device is coupled with at least one of the first mechanical transmission element and the second mechanical transmission element,
wherein the parking lock device includes a decoupling device for transitioning the coupling device into a decoupled state by decoupling the coupling device from at least one of the first mechanical transmission element and the second mechanical transmission element when a gear selector lever is in a parking lock position, and
wherein the parking lock device includes a sliding element for moving the second mechanical transmission element in relation to the first mechanical transmission element in the decoupled state;
coupling the first mechanical transmission element and the second mechanical transmission element with the coupling device, wherein the coupling device is movable along a movement axis;
decoupling the first mechanical transmission element and the second mechanical transmission element with the decoupling device; and
connecting the sliding element with the coupling device.

14. The method of claim 13, wherein the coupling device is detachably coupled with one of the first mechanical transmission element and the second mechanical transmission element with an engagement device, the engagement device including at least one engagement member that is movable in an engagement receptacle in a direction transverse to the movement axis, and wherein the engagement member is fixed with the other of the first mechanical transmission element and the second mechanical transmission element.

15. The method of claim 14, wherein the decoupling device includes a movable decoupling member for moving the engagement member into a non-engaged state.

16. The method of claim 15, wherein the decoupling member is movable along the movement axis and has a sliding surface, wherein a sliding component is fixed with the engagement member and is movable along the sliding surface, and wherein the sliding surface extends transverse to the movement axis of the engagement member.

17. The method of claim 16,
wherein the decoupling member and the sliding element form a constructional unit,
wherein the sliding element includes an attachment surface that is couplable with the coupling device, and
wherein the sliding surface is positioned upstream of the attachment surface in a sliding direction such that, when moving the constructional unit, the engagement member can be moved into the non-engaged state and then the coupling device is movable.

18. The method of claim 13, further comprising at least one drive unit for driving the decoupling device and the sliding element.

* * * * *